US012572221B2

(12) United States Patent (10) Patent No.: US 12,572,221 B2
Tang et al. (45) Date of Patent: Mar. 10, 2026

(54) IN-VEHICLE MID-AIR GESTURE-BASED INTERACTION METHOD, ELECTRONIC APPARATUS, AND SYSTEM

(71) Applicant: Shenzhen Yinwang Intelligent Technologies Co., Ltd., Shenzhen (CN)

(72) Inventors: Qiuyuan Tang, Shenzhen (CN); Shuaihua Peng, Shenzhen (CN); Hao Li, Shenzhen (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/974,178

(22) Filed: Dec. 9, 2024

(65) Prior Publication Data

US 2025/0103146 A1 Mar. 27, 2025

Related U.S. Application Data

(63) Continuation of application No. 18/147,608, filed on Dec. 28, 2022, now Pat. No. 12,164,697, which is a continuation of application No. PCT/CN2020/100079, filed on Jul. 3, 2020.

(51) Int. Cl.
| | |
|---|---|
| *G06F 3/01* | (2006.01) |
| *B60K 35/22* | (2024.01) |
| *B60K 37/20* | (2024.01) |
| *G06V 40/20* | (2022.01) |

(52) U.S. Cl.
CPC .............. *G06F 3/017* (2013.01); *B60K 35/22* (2024.01); *B60K 37/20* (2024.01); *G06V 40/28* (2022.01)

(58) Field of Classification Search
CPC ........ G06F 3/017; G06V 40/28; G06V 40/20; G06V 40/23; G06V 40/25; G06V 40/00; G06V 40/10; B60K 35/22; B60K 37/20
See application file for complete search history.

(56) References Cited

U.S. PATENT DOCUMENTS

| | | | | |
|---|---|---|---|---|
| 2013/0307774 A1* | 11/2013 | Hayashi | ............... | G06F 21/629 |
| | | | | 345/158 |
| 2014/0309862 A1 | 10/2014 | Ricci | | |
| 2017/0235371 A1 | 8/2017 | Hsiao et al. | | |
| 2017/0277503 A1 | 9/2017 | Kobayashi et al. | | |

(Continued)

FOREIGN PATENT DOCUMENTS

| | | |
|---|---|---|
| CN | 206258820 U | 6/2017 |
| CN | 106933346 A | 7/2017 |

(Continued)

*Primary Examiner* — Lisa S Landis
(74) *Attorney, Agent, or Firm* — Leydig, Voit & Mayer, Ltd.

(57) ABSTRACT

This application provides an in-vehicle mid-air gesture-based interaction method, an electronic apparatus, and a system, and relates to the field of intelligent vehicle technologies. The method includes: obtaining a first mid-air gesture detected by a camera; and starting, when a preset response operation corresponding to the first mid-air gesture matches a first user who initiates the first mid-air gesture, the preset response operation corresponding to the first mid-air gesture in response to the first mid-air gesture. The method can be used in an in-vehicle mid-air gesture-based interaction scenario, reduce a mid-air gesture misoperation rate, and ensure driving safety and interaction experience.

18 Claims, 8 Drawing Sheets

(56) References Cited

U.S. PATENT DOCUMENTS

2017/0282717 A1    10/2017  Jang et al.
2018/0024695 A1*    1/2018  Iyer ........................ B60K 35/22
                                              345/175
2019/0073040 A1     3/2019  Luchner et al.

FOREIGN PATENT DOCUMENTS

CN        109670282  A    4/2019
CN        110688053  A    1/2020
CN        111223479  A    6/2020
DE    102009036371  A1    4/2011
WO      2019136277  A1    7/2019

* cited by examiner

IN-VEHICLE MID-AIR GESTURE-BASED INTERACTION METHOD, ELECTRONIC APPARATUS, AND SYSTEM

CROSS-REFERENCE TO RELATED APPLICATIONS

This application is a continuation of U.S. patent application Ser. No. 18/147,608, filed on Dec. 28, 2022, which is a continuation of International Application No. PCT/CN2020/100079, filed on Jul. 3, 2020. All of the aforementioned patent applications are hereby incorporated by reference in their entireties.

TECHNICAL FIELD

This application relates to the field of intelligent vehicle technologies, and in particular, to an in-vehicle mid-air gesture-based interaction method, an electronic apparatus, and a system.

BACKGROUND

Currently, with rapid development of vehicle technologies, vehicles are increasingly popularized, and vehicles have become one of important means of transportation in people's daily life. In addition, with an increase of vehicle-mounted terminal screens, vehicle functions used by a user are not limited to driving. Human-machine intelligent interaction is an important basic function in an intelligent cabin of a future vehicle. A user is no longer limited to touch control on a touchscreen, and mid-air gestures are also gradually used in human-machine interaction in the field of intelligent vehicles.

A vehicle is a service scenario highly sensitive to safety. How to ensure safe driving of a vehicle while improving interaction experience is worth studying.

SUMMARY

This application provides a mid-air gesture-based interaction solution, including a mid-air gesture-based interaction method, an electronic apparatus, and a system, to be used in a vehicle cabin scenario to improve experience of interaction between a user and an electronic apparatus while ensuring vehicle driving safety.

It should be understood that the mid-air gesture-based interaction method provided in embodiments of this application may be performed by an electronic apparatus. The electronic apparatus may be an entire system of a computing device, or may be some devices, for example, a chip, in the computing device. Specifically, the electronic device may be a terminal, for example, a vehicle or a vehicle-mounted device (e.g., a vehicle-mounted machine), may be a system chip (also referred to as a system-on-a-chip, or an SoC chip) that can be disposed in a terminal, or may be another chip, for example, an image processing chip. In physical implementation, the another chip, for example, the image processing chip, may or may not be integrated in the system chip.

According to a first aspect, this application provides an in-vehicle mid-air gesture-based interaction method. The method may include: obtaining a first mid-air gesture detected by a camera; and starting, when a first response operation corresponding to the first mid-air gesture matches a first user who initiates the first mid-air gesture, the first response operation in response to the first mid-air gesture.

With the foregoing solution, an electronic apparatus can be prevented from directly responding to any mid-air gesture initiated by any user, to ensure driving safety and information security.

In a possible implementation, before the starting, when a preset response operation corresponding to the first mid-air gesture matches a first user who initiates the first mid-air gesture, the preset response operation corresponding to the first mid-air gesture in response to the first mid-air gesture, the method further includes: obtaining a response attribute of the first response operation corresponding to the first mid-air gesture; obtaining a user attribute of the first user who initiates the first mid-air gesture; and determining, based on the response attribute of the first response operation and the user attribute of the first user, whether the first response operation matches the first user, where the response attribute includes one or more of a response type, a response level, a response priority, or a response location, and the user attribute includes one or more of a user identity, a user location, or a user permission.

In a possible implementation, the obtaining a user attribute of the first user specifically includes: determining the user location of the first user based on a picture that corresponds to the first mid-air gesture and that is detected by the camera; and determining the user identity of the first user based on the user location of the first user.

It should be understood that the location of the first user is determined by using N pictures that correspond to the first mid-air gesture and that are collected by the camera, where N is a positive integer, and the user identity of the first user may be determined based on the location. The user identity may be a driver or a passenger. Specifically, a five-seat vehicle is used as an example. The passenger may be a passenger in a co-driver seat, or may be a passenger in a rear seat. The passenger in a rear seat may also be classified into a passenger in a rear-left seat, a passenger in a rear-right seat, and a passenger in a rear-middle seat, where left and right directions are determined by using an advancing direction of the vehicle as a reference direction. Alternatively, each seat in the vehicle is numbered, and a correspondence between the number and the user location is preset, to determine the user location of the first user based on the picture. With the foregoing solution, implementation is easy, and an amount of calculation is reduced.

In a possible implementation, the obtaining a user attribute of the first user specifically includes: determining the user identity of the first user based on face information of an in-vehicle user and a picture that corresponds to the first mid-air gesture and that is detected by the camera.

The face information of the in-vehicle user may be feature point information of a user face image, or may be a user face image.

In a possible implementation, when the response attribute of the first response operation is a driving operation and the user identity of the first user is a driver, the first response operation matches the first user. On the contrary, when the response attribute of the first response operation is a driving operation and the user identity of the first user is a passenger other than a driver, the first response operation does not match the first user.

It should be understood that matching between specific response attributes and specific user attributes may be preset. For example, the following may be preset: When the first response operation is an entertainment operation, response is performed to any user identity. However, when the first response operation is a driving operation, response is performed only to a user identity such as a driver or a safety administrator. A specific setting time may be a time before delivery, a time when an upgrade package is downloaded for upgrading a system, a time when a user performs setting, or the like. The setting may be stored locally on the electronic apparatus, or may be stored on a cloud server, and is obtained by the electronic apparatus from the cloud server by using a network each time. Specifically, for example, the setting may be obtained from the cloud server by using a telematics box T-box.

In a possible implementation, the obtaining a user attribute of the first user specifically includes: determining the user location of the first user based on a picture that corresponds to the first mid-air gesture and that is detected by the camera. The starting, when a first response operation corresponding to the first mid-air gesture matches a first user who initiates the first mid-air gesture, the first response operation in response to the first mid-air gesture specifically includes: starting, when the first response operation corresponding to the first mid-air gesture matches the first user who initiates the first mid-air gesture, the first response operation based on the user location of the first user in response to the first mid-air gesture.

In a possible implementation, the starting, when the first response operation corresponding to the first mid-air gesture matches the first user who initiates the first mid-air gesture, the first response operation based on the user location of the first user in response to the first mid-air gesture specifically includes: starting, when the first response operation corresponding to the first mid-air gesture matches the first user who initiates the first mid-air gesture, the first response operation in a region corresponding to the user location of the first user in response to the first mid-air gesture.

For example, if the first response operation is opening a vehicle window, a window next to the first user may be opened, and no operation is performed on a vehicle window near another user. For another example, if the first response operation is adjusting a volume, a volume of a speaker near the first user may be adjusted, so that only the volume around the first user is adjusted without affecting another user.

With the foregoing solution, adaptive response may be performed based on a location of a user who initiates a mid-air gesture, to avoid affecting experience of another user.

In a possible implementation, before the starting, when a first response operation corresponding to the first mid-air gesture matches a first user who initiates the first mid-air gesture, the first response operation in response to the first mid-air gesture, the method further includes: displaying a first display interface on a first display in a vehicle. The starting, when the first response operation corresponding to the first mid-air gesture matches the first user who initiates the first mid-air gesture, the first response operation based on the user location of the first user in response to the first mid-air gesture specifically includes: when the first response operation corresponding to the first mid-air gesture matches the first user who initiates the first mid-air gesture and the first display is not a display in front of the first user, displaying the first display interface on a second display in the vehicle in response to the first mid-air gesture, and moving an indication icon on the first display interface based on a moving trajectory of the first mid-air gesture in a preset direction.

With the foregoing solution, a user who initiates a mid-air gesture can sense, in an accurate and timely manner, that the camera has detected the mid-air gesture of the user and a processor is responding to an operation of the user, thereby preventing the user from initiating mid-air gestures for a plurality of times, and improving interaction experience of the user.

In a possible implementation, the starting, when a first response operation corresponding to the first mid-air gesture matches a first user who initiates the first mid-air gesture, the first response operation in response to the first mid-air gesture specifically includes: when a user permission threshold required for the first response operation corresponding to the first mid-air gesture is less than or equal to the user permission of the first user who initiates the first mid-air gesture, starting the first response operation in response to the first mid-air gesture.

For example, when the first response operation is a driving operation, a user permission required for the response operation may be set to a highest level, to exclude a passenger other than the driver and avoid safety accidents. For another example, when the first response operation is device adjustment, for example, air conditioner temperature adjustment, a user permission required for the response operation may be set to a specific level, to reduce repeated air conditioner temperature adjustment caused by unintentional arm swinging by a young child, or try to avoid a case that a child adjusts an air conditioner temperature to be excessively low, affecting health.

In a possible implementation, the method further includes: detecting a second mid-air gesture by using the camera, where the second mid-air gesture is initiated by a second user, and duration between an initiation time of the second mid-air gesture and an initiation time of the first mid-air gesture is less than a first preset threshold. The starting, when a first response operation corresponding to the first mid-air gesture matches a first user who initiates the first mid-air gesture, the first response operation in response to the first mid-air gesture specifically includes: when the user permission of the first user is higher than a user permission of the second user, and when the first response operation corresponding to the first mid-air gesture matches the first user who initiates the first mid-air gesture, preferentially starting the first response operation in response to the first mid-air gesture.

With the foregoing solution, a problem that a plurality of users initiate mid-air gestures within a same time period and the electronic apparatus does not know which mid-air gesture is to be responded to or performs random response may be resolved by preferentially responding to a mid-air gesture initiated by a user with a higher priority, thereby improving interaction experience of the user.

In a possible implementation, a control permission of the driver is higher than a control permission of another passenger.

In a possible implementation, a control permission of a passenger whose age is greater than a first threshold is higher than a control permission of a passenger whose age is less than a second threshold, where the first threshold is greater than the second threshold, and the first threshold and the second threshold are positive integers.

In a possible implementation, a control permission of a first passenger is higher than a control permission of a second passenger, where an age of the first passenger is greater than an age of the second passenger.

In a possible implementation, a control permission of an owner of a motor vehicle is higher than a control permission of a user other than the owner of the motor vehicle, for example, a driver and/or another passenger. With the foregoing solution, property safety of the owner of the motor vehicle can be ensured, and the vehicle can be prevented from being robbed or stolen.

In a possible implementation, before the starting, when a first response operation corresponding to the first mid-air gesture matches a first user who initiates the first mid-air gesture, the first response operation in response to the first mid-air gesture, the method further includes: when a distance between a location of the first mid-air gesture and the camera is greater than a second preset threshold, displaying a prompt message on a display in the vehicle, where the prompt message is used to prompt the first user to initiate a mid-air gesture to another camera.

In a possible implementation, before the starting, when a first response operation corresponding to the first mid-air gesture matches a first user who initiates the first mid-air gesture, the first response operation in response to the first mid-air gesture, the method further includes: when a projection ratio of the first mid-air gesture relative to a reference plane of a first camera is less than a third preset threshold, displaying a prompt message on a display in the vehicle, where the prompt message is used to prompt the first user to initiate a mid-air gesture to another camera.

In a possible implementation, before the starting, when a first response operation corresponding to the first mid-air gesture matches a first user who initiates the first mid-air gesture, the first response operation in response to the first mid-air gesture, the method further includes: when detection precision for the first mid-air gesture is less than a fourth preset threshold, displaying a prompt message on a display in the vehicle, where the prompt message is used to prompt the first user to initiate a mid-air gesture to another camera.

For example, a response operation for the first mid-air gesture is waking up an in-vehicle mid-air gesture function. The camera wakes up the in-vehicle mid-air gesture function after detecting the first mid-air gesture. After determining that mid-air gesture detection precision, of the camera, corresponding to a location at which the first mid-air gesture is initiated is less than a preset threshold, the processor may prompt, by using a prompt message, the user to initiate a mid-air gesture to another camera, to increase a response speed and detection precision for subsequent mid-air gesture-based interaction. The another camera may be a camera other than the camera, or may be a camera with a best detection angle for the user.

According to a second aspect, an embodiment of this application provides an in-vehicle mid-air gesture-based interaction apparatus. The apparatus includes a transceiver unit and a processing unit. The transceiver unit is configured to obtain a first mid-air gesture detected by a camera. The processing unit is configured to start, when a first response operation corresponding to the first mid-air gesture matches a first user who initiates the first mid-air gesture, the first response operation in response to the first mid-air gesture.

In a possible implementation, the transceiver unit is further configured to obtain a response attribute of the first response operation corresponding to the first mid-air gesture; the transceiver unit is further configured to obtain a user attribute of the first user who initiates the first mid-air gesture; and the processing unit is further configured to determine, based on the response attribute of the first response operation and the user attribute of the first user, whether the first response operation matches the first user, where the response attribute includes one or more of a response type, a response level, a response priority, or a response location, and the user attribute includes one or more of a user identity, a user location, or a user permission.

In a possible implementation, the processing unit is further configured to determine the user location of the first user based on a picture that corresponds to the first mid-air gesture and that is detected by the camera; and the processing unit is further configured to determine, based on the user location of the first user, whether the user identity of the first user is a driver.

In a possible implementation, when the response attribute of the first response operation is a driving operation and the user identity of the first user is a driver, the first response operation matches the first user.

In a possible implementation, the processing unit is further configured to determine the user location of the first user based on a picture that corresponds to the first mid-air gesture and that is detected by the camera; and that the processing unit is configured to start, when a first response operation corresponding to the first mid-air gesture matches a first user who initiates the first mid-air gesture, the first response operation in response to the first mid-air gesture specifically means that: the processing unit is configured to start, when the first response operation corresponding to the first mid-air gesture matches the first user who initiates the first mid-air gesture, the first response operation based on the user location of the first user in response to the first mid-air gesture.

In a possible implementation, that the processing unit is configured to start, when the first response operation corresponding to the first mid-air gesture matches the first user who initiates the first mid-air gesture, the first response operation based on the user location of the first user in response to the first mid-air gesture specifically includes:

the processing unit is configured to start, when the first response operation corresponding to the first mid-air gesture matches the first user who initiates the first mid-air gesture, the first response operation in a region corresponding to the user location of the first user in response to the first mid-air gesture.

In a possible implementation, the processing unit is further configured to display a first display interface on a first display in a vehicle; and that the processing unit is configured to start, when a first response operation corresponding to the first mid-air gesture matches a first user who initiates the first mid-air gesture, the first response operation in response to the first mid-air gesture specifically means that:

the processing unit is configured to: when the first response operation corresponding to the first mid-air gesture matches the first user who initiates the first mid-air gesture and the first display is not a display in front of the first user, display the first display interface on a second display in the vehicle in response to the first mid-air gesture, and move an indication icon on the first display interface based on a moving trajectory of the first mid-air gesture in a preset direction.

In a possible implementation, that the processing unit is configured to start, when a first response operation corresponding to the first mid-air gesture matches a first user who initiates the first mid-air gesture, the first response operation in response to the first mid-air gesture specifically means that:

the processing unit is configured to: when a user permission threshold required for the first response operation corresponding to the first mid-air gesture is less than or equal to the user permission of the first user who initiates the first mid-air gesture, start the first response operation in response to the first mid-air gesture.

In a possible implementation, the transceiver unit is further configured to obtain a second mid-air gesture detected by the camera, where the second mid-air gesture is initiated by a second user; and that the processing unit is configured to start, when a first response operation corresponding to the first mid-air gesture matches a first user who initiates the first mid-air gesture, the first response operation in response to the first mid-air gesture specifically means that:

the processing unit is configured to: when the user permission of the first user is higher than a user permission of the second user, and when the first response operation corresponding to the first mid-air gesture matches the first user who initiates the first mid-air gesture, preferentially start the first response operation in response to the first mid-air gesture.

In a possible implementation, a control permission of the driver is higher than a control permission of another passenger.

In a possible implementation, the processing unit is further configured to: when a distance between a location of the first mid-air gesture and the camera is greater than a second preset threshold, display a prompt message on a display in the vehicle, where the prompt message is used to prompt the first user to initiate a mid-air gesture to another camera.

In a possible implementation, the processing unit is further configured to: when a projection ratio of the first mid-air gesture relative to a reference plane of a first camera is less than a third preset threshold, display a prompt message on a display in the vehicle, where the prompt message is used to prompt the first user to initiate a mid-air gesture to another camera.

In a possible implementation, the electronic apparatus is a vehicle-mounted machine, a vehicle-mounted chip, or an intelligent vehicle.

According to a third aspect, an embodiment of this application provides an intelligent vehicle, including the electronic apparatus according to any one of the second aspect or the possible implementations of the second aspect.

According to a fourth aspect, a terminal is provided. The terminal includes: a touchscreen, where the touchscreen includes a touch-sensitive surface and a display; a camera; one or more processors; a memory; a plurality of application programs; and one or more computer programs. The one or more computer programs are stored in the memory, the one or more computer programs include instructions, and when the instructions are executed by the terminal, the terminal is enabled to perform the image processing method according to any one of the first aspect and the second aspect or the possible implementations.

According to a fifth aspect, a computer storage medium is provided, including computer instructions, where when the computer instructions are run on an electronic device, the electronic device is enabled to perform the interaction method according to any one of the first aspect or the possible implementations.

According to a sixth aspect, a computer program product is provided, where when the computer program product is run on a computer, the electronic device is enabled to perform the interaction method according to any one of the first aspect or the possible implementations.

According to a seventh aspect, a system is provided, including the electronic apparatus according to any one of the second aspect or the possible implementations of the second aspect, the intelligent vehicle according to any one of the third aspect or the possible implementations of the third aspect, or the terminal according to any one of the fourth aspect or the possible implementations of the fourth aspect.

For technical details, technical effects, and possible implementations of any one of the second aspect to the seventh aspect or the possible implementations of the second aspect to the seventh aspect, refer to related descriptions in any one of the first aspect or the possible implementations of the first aspect. Details are not described herein again.

It should be understood that, with the in-vehicle mid-air gesture-based interaction method provided in embodiments of this application, through matching between a user who initiates a mid-air gesture and a response operation corresponding to the mid-air gesture, interaction experience of the operation can be ensured while safe driving is ensured.

DESCRIPTION OF EMBODIMENTS

The following describes in detail embodiments of this application with reference to the accompanying drawings.

Figure 1:
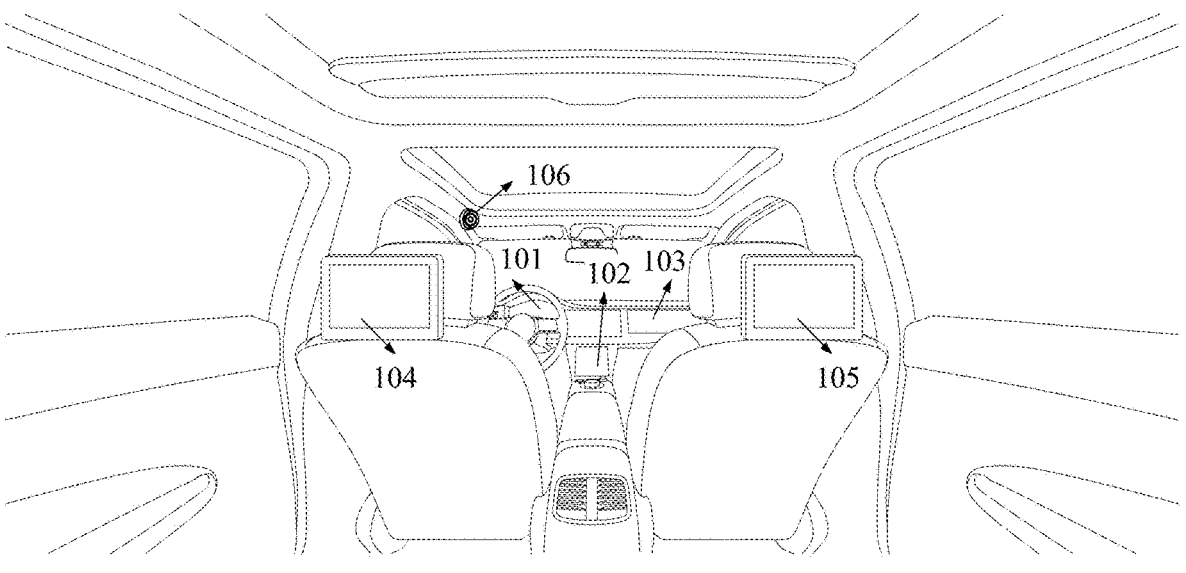
FIG. 1 is a schematic diagram of a structure of an interior of a vehicle according to an embodiment of this application.

FIG. 1 is a schematic diagram of a structure of an interior of a vehicle according to an embodiment of this application. Currently, in the field of vehicles, a vehicle-mounted terminal, for example, a vehicle-mounted machine (also referred to as an in-vehicle audio and video entertainment system), may be fixed in a center console of a vehicle, and a screen of the vehicle-mounted terminal may also be referred to as a center console display or a center console screen. In addition, fully digital display is gradually implemented in a cabin of some high-end vehicles, and one or more displays are disposed in the cabin to display a digital dashboard, an in-vehicle entertainment system, and other content. As shown in FIG. 1, a plurality of displays are disposed in a cabin, for example, a digital dashboard display 101, a center console screen 102, a display 103 in front of a passenger in a co-driver seat (also referred to as a passenger in a front seat), a display 104 in front of a passenger in a rear-left seat, and a display 105 in front of a passenger in a rear-right seat.

In addition, in FIG. 1, although only one camera 106 is shown near an A-pillar (pillar) on a driver side, a plurality of cameras may be disposed in the cabin, and locations of the cameras are flexible. For example, a camera in the cabin may be disposed above the center console screen of the vehicle, a camera in the cabin may be disposed on the left of the center console screen of the vehicle, a camera in the cabin may be disposed on the A-pillar or a B-pillar, and a camera in the cabin may be disposed in the front of a cabin roof of the vehicle. A user in the vehicle may initiate a mid-air gesture by using the camera to perform a corresponding function. However, a vehicle is a service scenario highly sensitive to safety. How to ensure safe driving of a vehicle while improving interaction experience is worth studying.

Figure 2A:
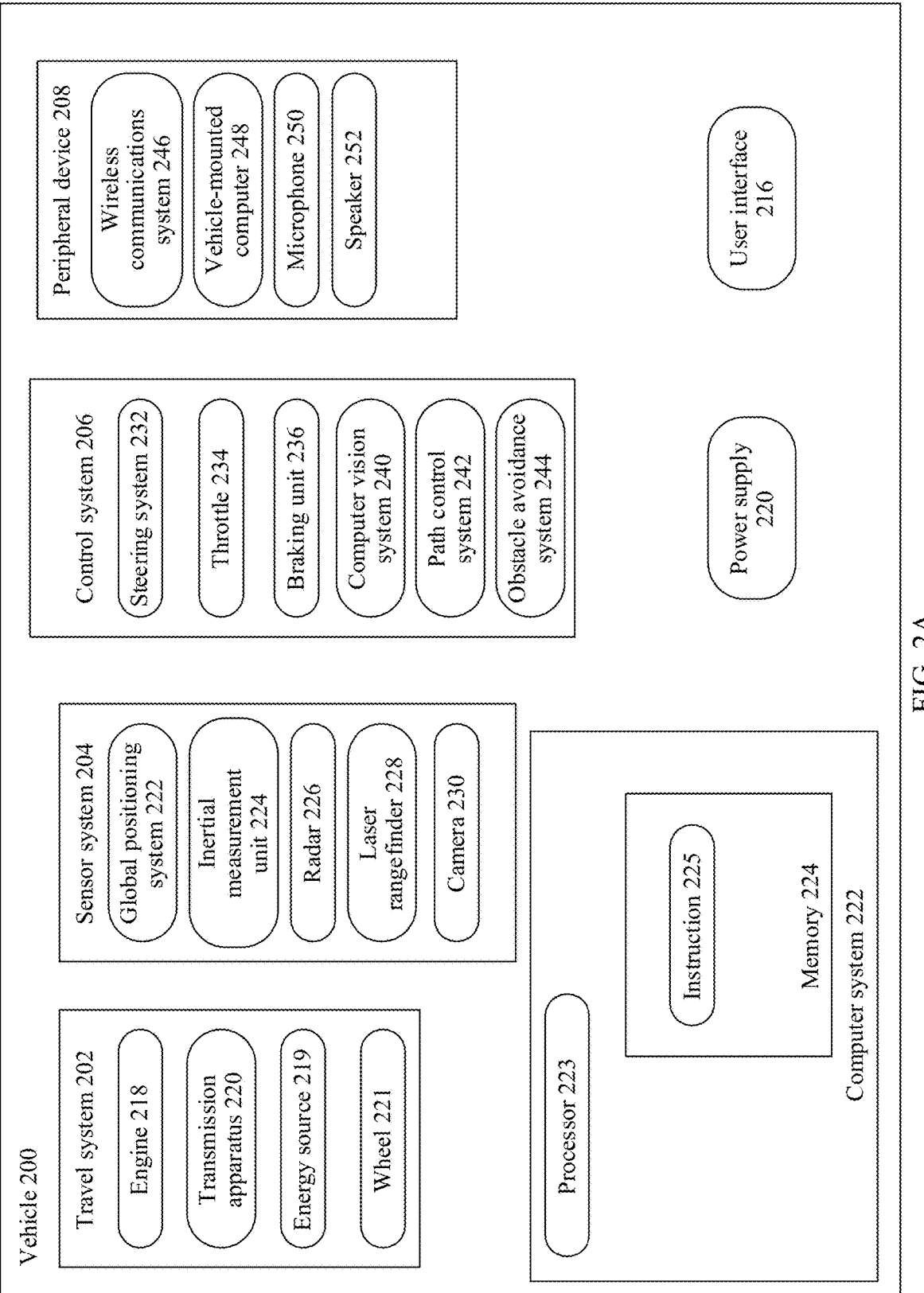
FIG. 2A is a functional block diagram of a vehicle 200 according to an embodiment of this application.

FIG. 2A is a functional block diagram of a vehicle 200 according to an embodiment of this application. The vehicle 200 may include a plurality of subsystems, for example, a travel system 202, a sensor system 204, a control system 206, one or more peripheral devices 208, a power supply 210, a computer system 212, and a user interface 216. Optionally, the vehicle 200 may include more or fewer subsystems, and each subsystem may include a plurality of elements. In addition, the subsystems and the elements of the vehicle 200 may be all interconnected in a wired or wireless (e.g., Bluetooth) manner.

The travel system 202 may include a component that provides power for motion of the vehicle 200. In an embodiment, the propulsion system 202 may include an engine 218, an energy source 219, a transmission apparatus 220, and a wheel/tire 221. The engine 218 may be an internal combustion engine, an electric motor, an air compression engine, or a combination of other types of engines, for example, a hybrid engine including a gasoline engine and an electric motor, or a hybrid engine including an internal combustion engine and an air compression engine. The engine 218 converts the energy source 219 into mechanical energy.

Examples of the energy source 219 include gasoline, diesel, other petroleum-based fuels, propane, other compressed gas-based fuels, anhydrous alcohol, a photovoltaic module, a battery, and other power sources. The energy source 219 may also provide energy for another system of the vehicle 200.

The transmission apparatus 220 may transmit mechanical power from the engine 218 to the wheel 221. The transmission apparatus 220 may include a gearbox, a differential, and a drive shaft. In an embodiment, the transmission apparatus 220 may further include another device, for example, a clutch. The drive shaft may include one or more shafts that may be coupled to one or more wheels 221.

The sensor system 204 may include several sensors that sense information about a surrounding environment of the vehicle 200. For example, the sensor system 204 may include a positioning system 222 (the positioning system may be a GPS system, a BeiDou system, or another positioning system), an inertial measurement unit (IMU) 224, a radar 226, a laser rangefinder 228, and a camera 230. The sensor system 204 may further include a sensor that monitors an internal system of the vehicle 200 (e.g., a vehicle-mounted air quality monitor, a fuel gauge, or an oil temperature gauge). Sensor data from one or more of these sensors may be used to detect an object and corresponding features (a location, a shape, a direction, a speed, and the like) of the object. The detection and recognition are key functions for implementing a safe operation by the autonomous vehicle 200.

The positioning system 222 may be configured to estimate a geographical location of the vehicle 200. The IMU 224 is configured to sense a location and direction change of the vehicle 200 based on an inertial acceleration. In an embodiment, the IMU 224 may be a combination of an accelerometer and a gyroscope.

The radar 226 may use a radio signal to sense an object in a surrounding environment of the vehicle 200. In some embodiments, in addition to sensing an object, the radar 226 may be further configured to sense a speed and/or an advancing direction of the object.

The laser rangefinder 228 may use laser light to sense an object in an environment in which the vehicle 200 is located. In some embodiments, the laser rangefinder 228 may include one or more laser sources, a laser scanner, one or more detectors, and another system component.

The camera 230 may be configured to capture a plurality of images of a surrounding environment of the vehicle 200 or inside the vehicle. The camera 230 may be a still camera or a video camera. The camera 230 may also be referred to as a camera 230. An in-vehicle camera may be a camera in a driver monitor system (DMS), or may be a camera in a cabin monitor system (CMS), or a built-in camera of a vehicle-mounted computer.

The control system 206 controls operations of the vehicle 200 and components of the vehicle 200. The control system 206 may include various elements, including a steering system 232, a throttle 234, a braking unit 236, a sensor fusion algorithm 238, a computer vision system 240, a path control system 242, and an obstacle avoidance system 244.

The steering system 232 may operate to adjust an advancing direction of the vehicle 200. For example, in an embodiment, the steering system 232 may be a steering wheel system.

The throttle 234 is configured to control an operating speed of the engine 218, so as to control a speed of the vehicle 200.

The braking unit 236 is configured to control the vehicle 200 to decelerate. The braking unit 236 may slow down the wheel 221 through friction. In another embodiment, the braking unit 236 may convert kinetic energy of the wheel 221 into a current. Alternatively, the braking unit 236 may reduce a rotational speed of the wheel 221 in another form, so as to control the speed of the vehicle 200.

The computer vision system 240 may operate to process and analyze an image captured by the camera 230, so as to recognize objects and/or features in the surrounding environment of the vehicle 200. The objects and/or the features may include a traffic signal, a road boundary, and an obstacle. The computer vision system 240 may use an object recognition algorithm, a structure from motion (SFM) algorithm, video tracking, and other computer vision technologies. In some embodiments, the computer vision system 240 may be configured to draw a map for an environment, track an object, estimate a speed of an object, and the like.

The path control system 242 is configured to determine a travel path for the vehicle 200. In some embodiments, the path control system 242 may determine the travel path for the vehicle 200 with reference to data from the sensor 238, the GPS 222, and one or more predetermined maps.

The obstacle avoidance system 244 is configured to recognize, evaluate, and avoid or bypass, in another manner, a potential obstacle in the environment of the vehicle 200.

Certainly, in an example, the control system 206 may additionally or alternatively include components other than those shown and described. Alternatively, some of the components shown above may be omitted.

The vehicle 200 interacts with an external sensor, another vehicle, another computer system, or a user by using the peripheral device 208. The peripheral device 208 may include a wireless communications system 246, a vehicle-mounted computer 248, a microphone 250, and/or a speaker 252.

In some embodiments, the peripheral device 208 provides a means for a user of the vehicle 200 to interact with the user interface 216. For example, the vehicle-mounted computer 248 may provide information for the user of the vehicle 200. The user interface 216 may further operate the vehicle-mounted computer 248 to receive a user input. The vehicle-mounted computer 248 may be operated by using a touch-screen. Sometimes, the vehicle-mounted computer 248 may also be referred to as a vehicle-mounted machine or an in-vehicle infotainment system. In other cases, the peripheral device 208 may provide a means for the vehicle 200 to communicate with another device located in the vehicle. For example, the microphone 250 may receive audio (e.g., a voice command or another audio input) from the user of the vehicle 200. Likewise, the speaker 252 may output audio to the user of the vehicle 200.

The wireless communications system 246 may wirelessly communicate with one or more devices directly or by using a communications network. For example, the wireless communications system 246 may use 3G cellular communication such as CDMA, EVDO, or GSM/GPRS, 4G cellular communication such as LTE, or 5G cellular communication. The wireless communications system 246 may communicate with a wireless local area network (WLAN) by using Wi-Fi. In some embodiments, the wireless communications system 246 may directly communicate with a device by using an infrared link, Bluetooth, or ZigBee. Other wireless protocols, such as various vehicle communications systems, for example, the wireless communications system 246, may include one or more dedicated short range communication (DSRC) devices, and these devices may include public and/or private data communication between vehicles and/or roadside stations.

The power supply 210 may supply power to the components of the vehicle 200. In an embodiment, the power supply 210 may be a rechargeable lithium-ion or lead-acid battery. One or more battery packs of such a battery may be configured as a power supply to supply power to the components of the vehicle 200. In some embodiments, the power supply 210 and the energy source 219 may be implemented together as those implemented together in some all-electric vehicles.

Some or all functions of the vehicle 200 are controlled by the computer system 212. The computer system 212 may include at least one processor 213. The processor 213 executes instructions 215 stored in a non-transitory computer-readable medium such as a data storage apparatus 214. The computer system 212 may be alternatively a plurality of computing devices that control individual components or subsystems of the vehicle 200 in a distributed manner.

The processor 213 may be any conventional processor such as a commercially available CPU. Alternatively, the processor may be a dedicated device such as an ASIC or another hardware-based processor. Although FIG. 2A functionally shows the processor, the memory, and other elements of the computer system 210 in a same block, a person of ordinary skill in the art should understand that the processor, the computer, or the memory may actually include a plurality of processors, computers, or memories that may or may not be stored in a same physical housing. For example, the memory may be a hard disk drive or another storage medium located in a housing different from that of the computer 210. Therefore, a reference to the processor or the computer is understood as including a reference to a set of processors, computers, or memories that may or may not operate in parallel. Different from using a single processor to perform the steps described herein, some components, such as a steering component and a deceleration component, each may have its own processor, and the processor performs only calculation related to a component-specific function.

In various aspects described herein, the processor may be located away from the vehicle and wirelessly communicate with the vehicle. In another aspect, some of the processes described herein are performed on a processor arranged in the vehicle, and others are performed by a remote processor, including performing a necessary step to perform single manipulation.

In some embodiments, the data storage apparatus 214 may include the instructions 215 (e.g., program logic), and the instructions 215 may be executed by the processor 213 to perform various functions of the vehicle 200, including the functions described above. The data storage apparatus 214 may also include additional instructions, including instructions to send data to, receive data from, interact with, and/or control one or more of the propulsion system 202, the sensor system 204, the control system 206, and the peripheral device 208.

In addition to the instructions 215, the data storage apparatus 214 may further store data, for example, a road map, path information, a location, a direction, a speed, and other vehicle data of a vehicle, and other information. The information may be used by the vehicle 200 and the computer system 212 when the vehicle 200 operates in an autonomous mode, a semi-autonomous mode, and/or a manual mode.

The user interface 216 is configured to provide information for or receive information from the user of the vehicle 200. Optionally, the user interface 216 may include one or more input/output devices in a set of peripheral devices 208, for example, the wireless communications system 246, the vehicle-mounted computer 248, the microphone 250, and the speaker 252.

The computer system 212 may control a function of the vehicle 200 based on inputs received from various subsystems (e.g., the travel system 202, the sensor system 204, and the control system 206) and the user interface 216. For example, the computer system 212 may control, by using an input from the control system 206, the steering unit 232 to avoid obstacles detected by the sensor system 204 and the obstacle avoidance system 244. In some embodiments, the computer system 212 is operable to provide control over many aspects of the vehicle 200 and the subsystems of the vehicle 200.

Optionally, one or more of the foregoing components may be mounted in separation from or associated with the vehicle 200. For example, the data storage apparatus 214 may be partially or completely separated from the vehicle 200. The foregoing components may be communicatively coupled together in a wired and/or wireless manner.

Optionally, the foregoing components are merely examples. In actual application, components in the foregoing modules may be added or omitted according to an actual requirement. FIG. 2A should not be understood as a limitation on embodiments of this application.

An automated driving vehicle traveling on a road, for example, the foregoing vehicle 200, may recognize an object in a surrounding environment of the vehicle, to determine whether to adjust a current speed. The object may be another vehicle, a traffic control device, or another type of object. In some examples, each recognized object may be independently considered, and a speed to which the automated driving vehicle needs to be adjusted may be determined based on a feature of the object, for example, a current speed or an acceleration of the object, or a distance between the object and the vehicle.

Optionally, the automated driving vehicle 200 or computing devices (e.g., the computer system 212, the computer vision system 240, and the data storage apparatus 214 in FIG. 2A) associated with the automated driving vehicle 200 may predict behavior of a recognized object based on a feature of the recognized object and a condition (e.g., traffic, rain, or ice on a road) of a surrounding environment. Optionally, all recognized objects depend on behavior of each other. Therefore, all the recognized objects may be alternatively jointly considered to predict behavior of a single recognized object. The vehicle 200 can adjust the speed of the vehicle 200 based on the predicted behavior of the recognized object. In other words, the automated driving vehicle can determine, based on the predicted behavior of the object, that the vehicle needs to be adjusted to a stable status (e.g., an adjustment operation may include acceleration, deceleration, or stop). In this process, another factor may also be considered to determine the speed of the vehicle 200, for example, a lateral location of the vehicle 200 on a road on which the vehicle 200 travels, a curvature of the road, and proximity between a static object and a dynamic object.

In addition to providing an instruction for adjusting the speed of the automated driving vehicle, the computing device may further provide an instruction for modifying a steering angle of the vehicle 200, so that the automated driving vehicle follows a given trajectory and/or maintains a safe lateral distance and a safe longitudinal distance from an object (e.g., a car in an adjacent lane of the road) near the automated driving vehicle.

The vehicle 200 may be a car, a truck, a motorcycle, a bus, a boat, an airplane, a helicopter, a lawn mower, an entertainment vehicle, a playground vehicle, a construction device, a tram, a golf cart, a train, a handcart, or the like. This is not particularly limited in embodiments of the present invention.

Figure 2B:
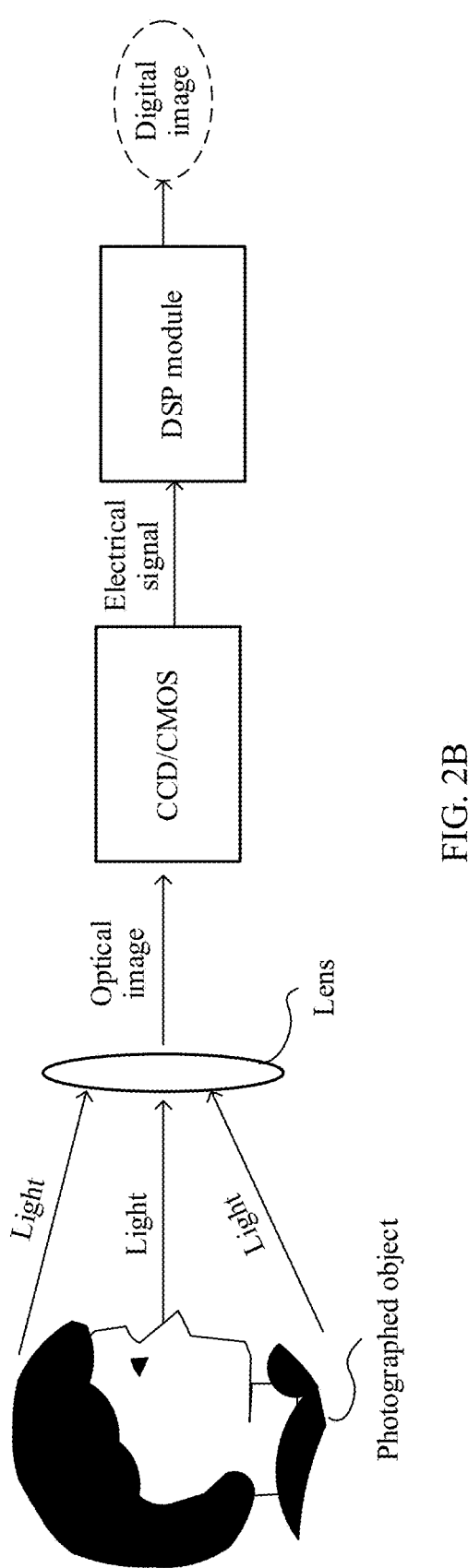
FIG. 2B is a schematic diagram of a photographing principle of a camera according to an embodiment of this application.

FIG. 2B is a schematic diagram of a photographing principle of a camera according to an embodiment of this application. As shown in FIG. 2B, the camera 230 usually includes a lens (lens) and a photosensitive element (sensor). The photosensitive element may be any photosensitive device, for example, a CCD (charge-coupled device) or a CMOS (complementary metal oxide semiconductor). Still as shown in FIG. 2B, in a process of taking a photo or recording a video, an optical image may be generated after reflected light of a photographed object passes through the lens, the optical image is projected onto the photosensitive element, the photosensitive element converts a received optical signal into an electrical signal, and then the camera 230 sends the obtained electrical signal to a DSP (digital signal processing) module for digital signal processing, to finally obtain each frame of digital image. In this embodiment of this application, the camera 230 may be configured to collect a mid-air gesture input by a user. For example, the camera 230 may be set to an always on (always on) state to collect a current image in real time. The camera 230 may send each frame of collected image to a processor 213. If it is recognized, from the collected image, that the user has performed a preset enabling gesture, it indicates that the user expects to interact with an electronic device by using a mid-air gesture. In this case, the processor 110 may recognize, based on an image sent by the camera 230 in real time, a specific mid-air gesture input by the user in this case.

Figure 3:
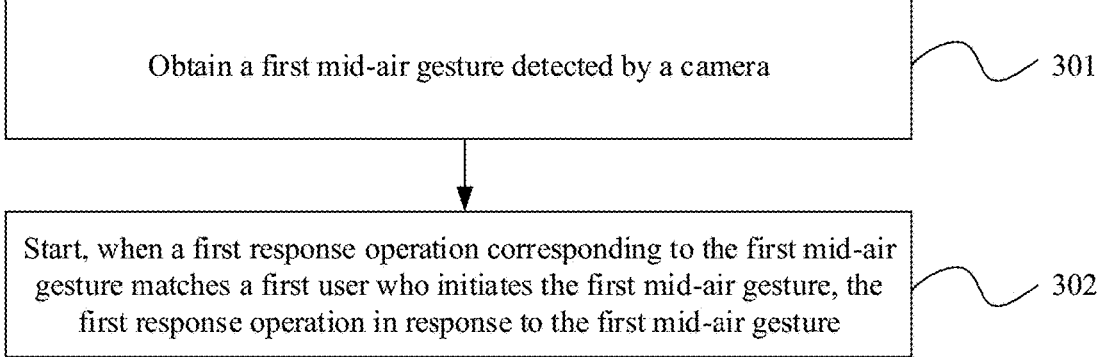
FIG. 3 is a schematic flowchart of an in-vehicle mid-air gesture-based interaction method according to an embodiment of this application.

FIG. 3 is a schematic flowchart of an in-vehicle mid-air gesture-based interaction method according to an embodiment of this application. It should be understood that the interaction method may be performed by an electronic apparatus. The electronic apparatus may be an entire computing device, for example, a vehicle or a vehicle-mounted device such as a vehicle-mounted machine, or may be some components used in a computing device, for example, a chip in a vehicle-mounted machine. As shown in FIG. 3, the method includes the following steps.

S301: Obtain a first mid-air gesture detected by a camera.

At least one camera may be mounted in a vehicle, for example, a camera of a DMS, a camera of a CMS, a camera mounted on a vehicle-mounted machine, or a camera mounted near a center console. The camera of the DMS may be mounted near an A-pillar (A-pillar) in the vehicle or near a location of a dashboard. Usually, the camera of the DMS needs to be able to collect an expression, a posture, an action, and the like of a driver, to analyze and determine behavior of the driver, so as to assist the driver in behavior, for example, driving. Usually, the camera of the CMS may be mounted near an upper center region of a front windshield, and/or in a top center region of a cabin or at another location. A photographed target of the camera of the CMS usually includes a user in the cabin, for example, a driver, a passenger in a front seat, or a passenger in a rear seat. The camera of the CMS usually needs to collect an expression, a posture, an action, and the like of the user in the cabin, to monitor behavior of the user in the cabin.

The camera may be a multi-lens camera, for example, a single-lens camera, a dual-lens camera, or a triple-lens camera, or may be a 3D camera. A processor may obtain, based on an image obtained by the camera, a change in a location of an object or a user in the image. For example, the processor may obtain, based on an image obtained by the 3D camera, a change in a distance between an object or a user in the image and a vehicle-mounted machine. Alternatively, the processor may obtain images collected by a plurality of cameras, and obtain, by building a model, a change in a distance between an object or a user in the images and the vehicle-mounted machine.

Data collected by the camera may be stored in a memory, or uploaded to a cloud for storage. The processor may obtain, by using an interface circuit through wired communication, wireless communication (e.g., Bluetooth or a cellular network), or the like, the data collected by the camera.

For example, an in-vehicle camera may be set to a normally open state. In other words, the in-vehicle camera may be always in an operating state, and the camera may collect an image within a photographing range based on specific operating frequency. In addition, for an electric vehicle sensitive to power consumption, a camera may be alternatively turned off by default, or turned on by default when there is a user in the vehicle.

Figure 4:
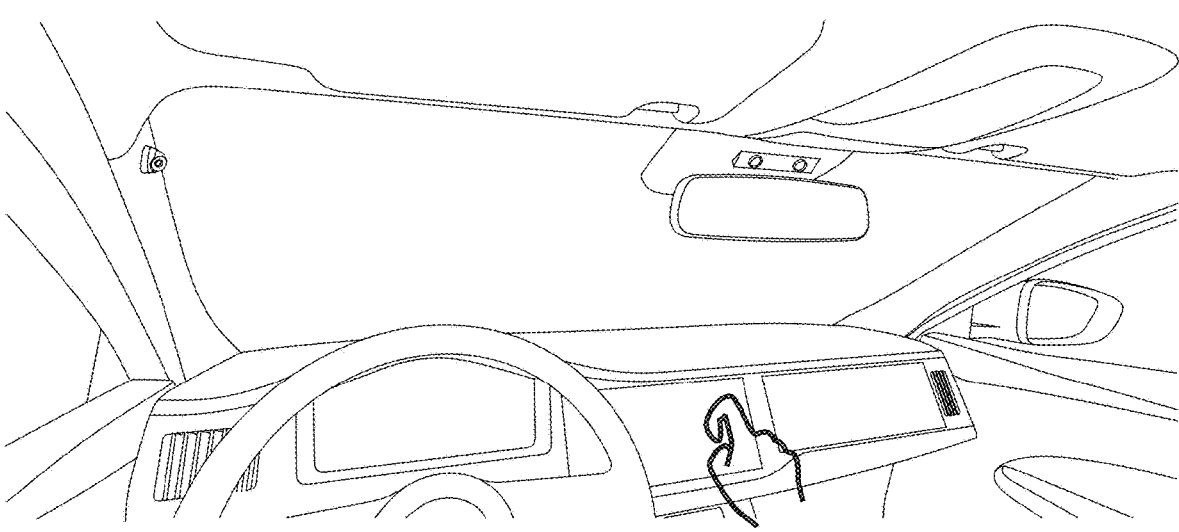
FIG. 4 is a schematic diagram of an in-vehicle mid-air gesture according to an embodiment of this application.
Figure 5:
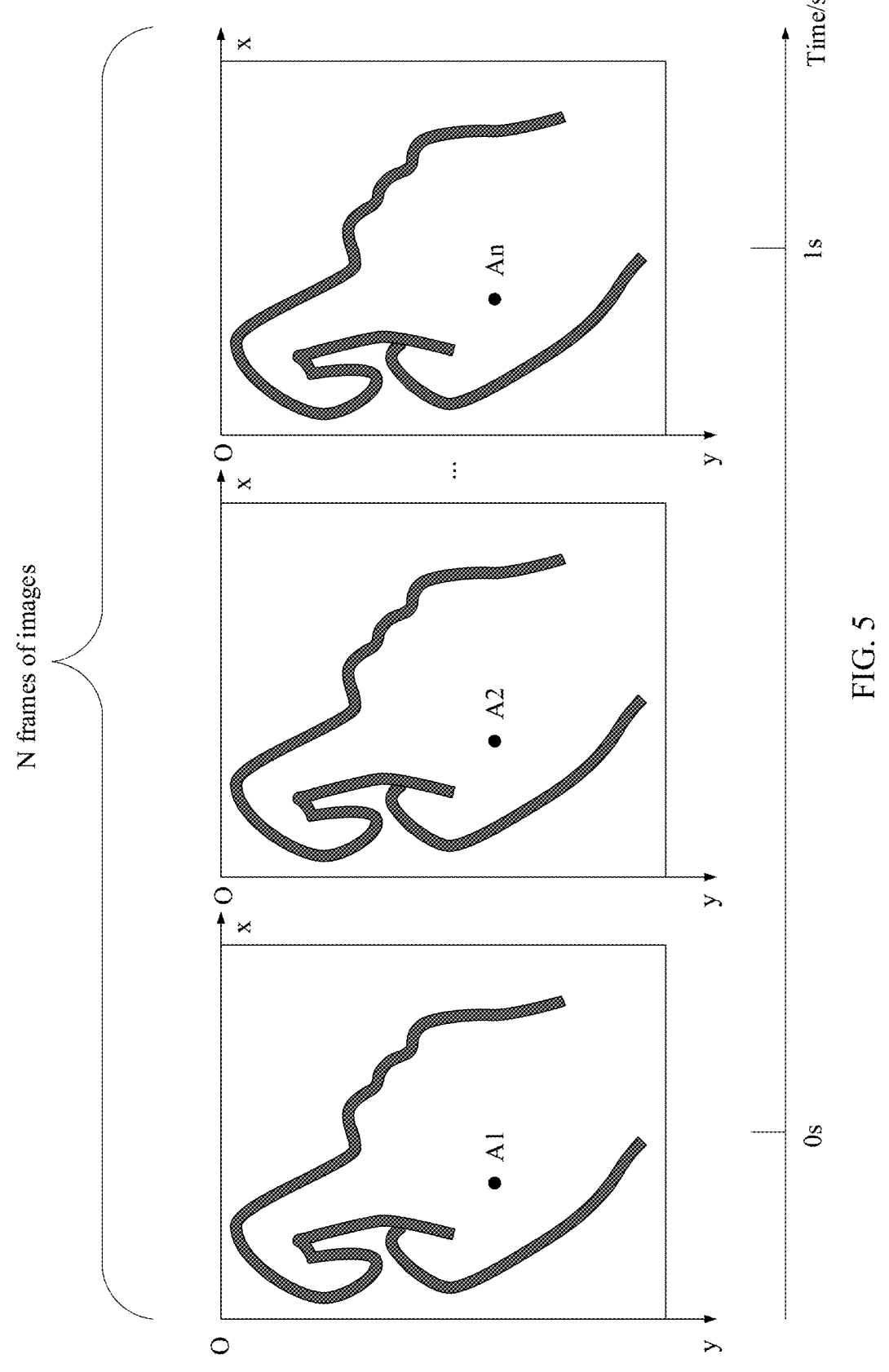
FIG. 5 is a schematic diagram of modeling of an in-vehicle mid-air gesture according to an embodiment of this application.

FIG. 4 is a schematic diagram of a scenario of an in-vehicle mid-air gesture according to an embodiment of this application. FIG. 5 is a schematic diagram of modeling of an in-vehicle mid-air gesture according to an embodiment of this application.

For example, because there are many users in the cabin and the users have different motion ranges and angles, the processor may alternatively turn off a mid-air gesture function by default, to reduce power consumption and save computing power. In this case, when a user expects to interact with the vehicle-mounted machine by using a mid-air gesture, as shown in FIG. 4, the user may input a mid-air gesture enabling gesture within the photographing range of the camera. For example, the enabling gesture may be a gesture that an index finger of the user is bent and hovers for 1s. The camera may collect a plurality of frames of images obtained when the index finger of the user is bent and hovers. The processor may recognize, based on the plurality of frames of images collected by the camera, whether the user is currently inputting the enabling gesture. For another example, the enabling gesture may be that the user makes a "Z" shape by using a gesture. The camera may collect a plurality of frames of images of the user making the gesture. The processor recognizes, based on the plurality of frames of images collected by the camera, whether the user is currently inputting the enabling gesture. Because space in the vehicle is large, the photographing range that can be collected by the camera is large, and the enabling gesture may be alternatively extended and understood as an enabling gesture or an enabling action. For example, the enabling gesture or the enabling action may be making a semicircular shape with an arm. The camera may collect a plurality of frames of images of the gesticulation action of the user. The processor recognizes, based on the plurality of frames of images collected by the camera, whether the user is currently inputting the enabling action.

That the index finger of the user is bent and hovers for 1s is used an example below. The camera may collect, in real time, an object image within the photographing range of the camera. The processor may obtain, through wired communication or wireless communication, the image collected by the camera. For example, the processor obtains N frames of images collected by the camera within the last 1s, where N is a positive integer. In addition, the processor may perform modeling on a collected object. As shown in FIG. 5, the processor obtains N frames of images collected by the camera within the last 1s. For example, an x-axis and a y-axis are established by using an upper right corner of each frame of image as an origin O. A pixel may be used as a unit for the x-axis and the y-axis; or a distance unit, for example, mm or cm, may be set. The processor may recognize a gesture pattern of the user in the N frames of images, and a reference point A in the pattern. The reference point A may be any sampling point in the gesture pattern, and may be specifically set and adjusted in an algorithm. For example, the reference point A may be a center point of the gesture pattern, or the reference point A may be an endpoint of the index finger of the user.

If each of the N frames of images includes a gesture pattern or a quantity of images including a gesture pattern in the N frames of images is greater than a preset value 1, it indicates that a palm of the user keeps appearing within the photographing range of the camera within the 1s. In addition, the processor may calculate a moving distance of the palm of the user based on coordinates of reference points A1, A2, . . . , and An in the N frames of images. If the moving distance of the palm of the user is less than a preset value 2 (e.g., the preset value 2 is 50 pixel units), it indicates that the palm of the user keeps hovering within the photographing range of the camera within the 1s. In this case, the processor may determine that the user has input the preset enabling gesture.

It should be understood that, in a specific implementation process, in addition to a Cartesian rectangular coordinate system, a polar coordinate system, a spherical coordinate system, a cylindrical coordinate system, or another coordinate system may be alternatively used to build a model, and decompose a gesture operation to determine a change in a location of the palm or a finger of the user. This is not limited in this application. Descriptions are provided by using an example in which a model is built based on the spherical coordinate system. The camera is used as an origin. It is assumed that one of the reference points is a P point, a horizontal direction is an x-axis, a vertical direction is a z-axis, where an upward direction is a positive z-axis, and a y-axis is perpendicular to a plane formed by the x-axis and the z-axis. Calculation is performed based on a distance r from the P point to the origin, an included angle $\theta$ between the positive z-axis and a connection line from the origin to the P point, and an azimuth $\psi$ between a positive x-axis and a projection line, on an xy plane, of the connection line from the origin to the P point. The reference point may be a mid-air gesture or one or more sampling points in a mid-air gesture.

In some other examples, the user may alternatively trigger, in another manner, the vehicle to enter a mid-air gesture operation mode. For example, the user may wake up, by inputting a voice signal for enabling a mid-air gesture, the camera to collect a mid-air gesture input by the user. For another example, a corresponding button (e.g., a virtual button or a physical button) or an operation (e.g., a press operation or a double-tap operation) may be set in the vehicle-mounted machine to enable the mid-air gesture operation mode. After detecting that the user taps the button or performs the operation, the camera may start to collect a mid-air gesture input by the user. In addition, a location at which the index finger of the user is bent and that is collected by the camera for the first time may be used as a start location A1 at which the user is to subsequently input a mid-air gesture. Alternatively, the camera may detect whether the user has performed a preset hover gesture, and if detecting that the user has performed the preset hover gesture, the camera may use a hover location of the user as a start location A1 at which the user is to subsequently input a mid-air gesture.

For example, a plurality of cameras may be disposed in the vehicle, and there may be a plurality of users in the vehicle. Therefore, to obtain a better photographing angle, a user who initiates a mid-air gesture is prompted, based on a location of the user and a location of a camera, to input a mid-air gesture through gesticulation to a camera with a better angle. For example, after determining that mid-air gesture detection precision, of the camera, corresponding to a location at which the first mid-air gesture is initiated is less than a first preset threshold, the processor may prompt, by using a prompt message, the user to initiate a mid-air gesture to another camera, to increase a response speed and detection precision for subsequent mid-air gesture-based interaction. The another camera may be a camera other than the camera, or may be a camera with a best detection angle for the user. For example, it is detected that a passenger in a rear seat has made a mid-air gesture toward the camera of the DMS, where the camera of the DMS is disposed above and near the A-pillar. In this case, a detection angle of the camera of the DMS is poor, and prompt information may be displayed on a display to prompt the user to make a mid-air gesture toward the camera of the CMS, where the camera of the CMS is disposed near a rearview mirror.

The mid-air gesture detection precision may include high-precision detection and low-precision detection, and the mid-air gesture detection precision may further include medium-precision detection. Alternatively, the mid-air gesture detection precision may include high-precision detection and non-high-precision detection, or low-precision detection and non-low-precision detection. In addition, a preset threshold may be used for distinguishing.

In addition, there are a plurality of optional implementations of determining whether a mid-air gesture is easy to take effect or whether high-precision detection or low-precision detection is possible. For example, for a same camera, whether a mid-air gesture is easy to take effect or whether high-precision detection or low-precision detection is possible is determined based on a distance between a location of the mid-air gesture and a reference plane of the camera. Alternatively, for a same camera, whether a mid-air gesture is easy to take effect or whether high-precision detection or low-precision detection is possible is determined based on a projection ratio of the mid-air gesture to a reference plane of the camera. For example, when the distance between the location of the mid-air gesture and the reference plane of the camera or the projection ratio of the mid-air gesture to a reference plane of the camera is greater than a second preset threshold, it is considered that the mid-air gesture is easy to take effect or high-precision detection, or non-low-precision detection is possible; otherwise, it is considered that the mid-air gesture is not easy to take effect, or high-precision detection or low-precision detection is impossible, and the mid-air gesture can be ignored. The reference plane of the camera may be further extended to a plane on which a display is located, or the like. When a mid-air gesture is not easy to take effect or non-high-precision detection or low-precision detection is possible, a prompt message may be displayed on a display in the vehicle, where the prompt message is used to prompt a user who initiates the mid-air gesture to initiate a mid-air gesture to another camera.

S302: Start, when a first response operation corresponding to the first mid-air gesture matches a first user who initiates the first mid-air gesture, the first response operation in response to the first mid-air gesture.

The response attribute includes one or more of a response type, a response level, a response priority, or a response location. The user attribute includes one or more of a user identity, a user location, or a user permission.

The response type may be a driving operation, an entertainment operation, an air conditioner parameter adjustment operation, or the like. The response location may be a region corresponding to a single user, or may be a region corresponding to the entire cabin.

It should be understood that the location of the first user is determined by using N pictures that correspond to the first mid-air gesture and that are collected by the camera, where N is a positive integer, and the user identity of the first user may be determined based on the location. Alternatively, matching is performed between face information of an in-vehicle user and N pictures that correspond to the first mid-air gesture and that are collected by the camera, to determine the user identity of the first user. The face information of the in-vehicle user may be feature point information of a user face image, or may be a user face image.

The user identity may be a driver or a passenger. Specifically, a five-seat vehicle is used as an example. The passenger may be a passenger in a co-driver seat, or may be a passenger in a rear seat. The passenger in a rear seat may also be classified into a passenger in a rear-left seat, a passenger in a rear-right seat, and a passenger in a rear-middle seat, where left and right directions are determined by using an advancing direction of the vehicle as a reference direction. Alternatively, each seat in the vehicle is numbered, and a correspondence between the number and the user location is preset, to determine the user location of the first user based on the picture. With the foregoing solution, implementation is easy, and an amount of calculation is reduced.

For example, a mapping relationship between a mid-air gesture and a response operation may be set, and the processor may determine, based on the obtained first mid-air gesture, a response operation corresponding to the first mid-air gesture. For example, Table 1 shows an example of a mapping relationship between mid-air gestures and response operations. The processor may determine, by using an image processing technology (e.g., an image recognition technology), the first mid-air gesture made by the user, and determine the first response operation based on Table 1 and the detected first mid-air gesture.

TABLE 1

| Mid-air gesture | Response operation |
|---|---|
| Make "W" | Open a vehicle window |
| Make a circle | Turn on an air conditioner |
| Make an oblique line from the upper left to the lower right | Perform an emergency brake |
| . . . | . . . |

For example, a mapping relationship between a response operation and a user permission may be set. Specifically, for example, Table 2 shows an example of a mapping relationship between response operations and minimum user permission requirements, where a level 1 and a level 3 are respectively minimum user permissions required for performing the response operations, and a larger number indicates a lower permission level. That is, a user permission corresponding to the level 1 is higher than a user permission corresponding to the level 3. User permissions may be set based on user identities. For example, a user permission of a driver is a level 1, a user permission of a passenger in a co-driver seat is a level 2, and a user permission of a passenger in a rear seat is a level 3. Alternatively, user permissions may be set based on ages of users. For example, a user permission of a passenger older than 18 years and a driver is a level 1, a user permission of a passenger older than 12 years and younger than or equal to 18 years is a level 2, and a user permission of a passenger younger than or equal to 12 years is a level 3. When the processor determines, by using the image processing technology (e.g., the image recognition technology), that the first mid-air gesture made by the user is "W" and the initiation user is the driver, the processor may determine that a corresponding response operation is to open a vehicle window. In addition, the user permission of the driver meets a minimum user permission for opening the vehicle window. In this case, the first response operation is started in response to the first mid-air gesture.

TABLE 2

| Response operation | Minimum user permission |
|---|---|
| Open a vehicle window | Level 3 |
| Turn on an air conditioner | Level 3 |
| Perform an emergency brake | Level 1 |
| . . . | . . . |

For example, a response attribute may be set for a response operation corresponding to a mid-air gesture. The response attribute includes one or more of the following attributes: a response type, a response location, a response permission, a response level (e.g., a minimum user permission required for a response), a response priority, or the like. The response attribute may also be referred to as an operation attribute. This is not limited in this application. For example, the response type may be a driving operation, an entertainment operation, an air conditioner adjustment operation, or an on/off operation. The response location may be a region near the driver, a passenger region, or the like. For example, the minimum user permission required for a response is as follows: The minimum user permission required for performing an emergency brake is the level 1, and the minimum user permission required for turning on the air conditioner is the level 3. For example, the response priority is as follows: The driver is preferentially responded to, a user with a higher user permission is preferentially responded to, or an older user is preferentially responded to. A user attribute may also be set for a user who initiates a mid-air gesture. The user attribute includes one or more of the following attributes: a user location, a user identity, or a user permission.

After obtaining the first mid-air gesture detected by the camera, the processor may determine the first response operation corresponding to the first mid-air gesture, and the first user who initiates the first mid-air gesture, obtain the response attribute of the first response operation and the user attribute of the first user, determine, based on the attribute of the first response operation and the user attribute of the first user, whether the first response operation matches the first user, and when the first response operation corresponding to the first mid-air gesture matches the first user who initiates the first mid-air gesture, start the first response operation; otherwise, skip starting the first response operation.

For example, to adapt to personalized requirements of different passengers or the driver in the vehicle, a plurality of displays may be disposed in the vehicle, or display may be performed in different regions of one display. For example, for a car, there is a display in front of a driver to display driving information such as a digital dashboard, there is a display in front of a passenger in a co-driver seat to display audio and video entertainment information, and there is a display at each of the back of a seat of the driver and the back of a seat of the passenger in the co-driver seat for use by a passenger in a rear seat. When a user performs adjustment by using a mid-air gesture, display may be performed on a display corresponding to the user. Specifically, the processor performs display on a corresponding display based on an identity of a user who initiates a mid-air gesture detected by the camera, to avoid affecting use experience of another user.

For example, because there are many functions and scenarios that can be controlled by using a mid-air gesture in the vehicle, one function may be controlled by different in-vehicle users. Therefore, to ensure driving safety, different user control priorities may be set for a function that can be controlled by using a mid-air gesture in the vehicle. For example, for mid-air gesture-based control on up/down of four vehicle windows in the vehicle, the driver may be set to have a highest user control priority. An up/down setting of a vehicle window of the driver seat can be controlled only by the driver. User control priorities for up/down of a vehicle window near another passenger are as follows: the driver, a passenger identity corresponding to the vehicle window, and a passenger identity corresponding to another passenger. Alternatively, for the mid-air gesture-based control on the up/down of the four vehicle windows in the vehicle, user control priorities are set based on ages. A user older than 10 years may control up/down of a vehicle window in the vehicle, and a user younger than or equal to 10 years is not granted a control permission. For another example, for mid-air gesture-based control on the digital dashboard, the driver may be set to have a highest user control priority, and setting may be performed only by the driver. Another user cannot control a function of the digital dashboard regardless of how the user initiates a mid-air gesture, thereby ensuring driving safety. Similarly, in a same time period, if a plurality of users in the vehicle perform mid-air gestures, when computing power is limited, a mid-air gesture initiated by a user corresponding to a higher control priority may be preferentially processed. For example, in the time period, only the mid-air gesture initiated by the user is processed; or the mid-air gesture initiated by the user is processed first, and then a mid-air gesture initiated by another user is processed. The control priority may be set before delivery, or may be set by the user during use.

Assuming that the first mid-air gesture is not an enabling gesture, before S301, the method 300 may further include S303.

S303: Obtain an enabling gesture detected by the camera, and display a preset indication icon on an in-vehicle display in response to the enabling gesture.

In step S303, after the processor detects that the user has input the preset enabling gesture, it indicates that the user expects to control, by using a mid-air gesture, an application displayed on a current in-vehicle display. To guide and prompt the user to efficiently and correctly input a mid-air gesture, a preset indication icon may be displayed at a preset location on an in-vehicle display, and a location, a length, or a shape of the indication icon on an interface are changeable.

Figure 6:
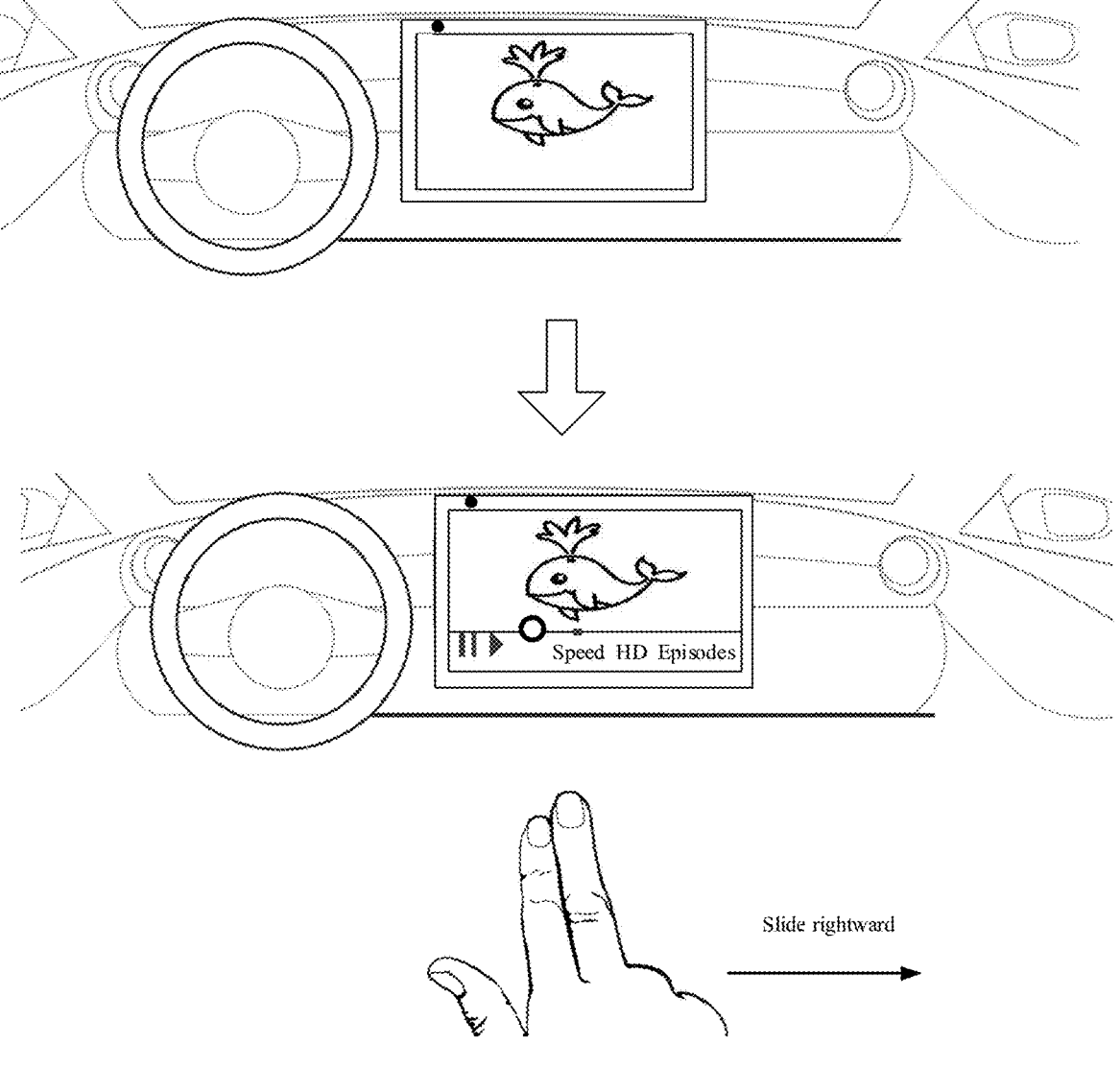
FIG. 6 is a schematic diagram of a scenario of an in-vehicle mid-air gesture according to an embodiment of this application.

FIG. 6 is a schematic diagram of a scenario of an in-vehicle mid-air gesture according to an embodiment of this application. For example, a music app is running on a display of the vehicle-mounted machine. As shown in FIG. 6, when the user inputs the enabling gesture, the display is displaying a first display interface of the music app. After it is detected that the user has input the enabling gesture, a first indication icon may be displayed on the display. After the first indication icon appears on the first display interface of the music app, the user may learn that the vehicle-mounted machine has entered the mid-air gesture operation mode, so that the user is prompted to start to input a corresponding mid-air gesture.

The first indication icon 602 may be a swipe indication icon, a progress bar, or the like. The first indication icon 602 may be a linear or arc-shaped icon. A display effect, for example, a specific shape, size, location, or color, of the first indication icon 602 is not limited in this embodiment of this application. The first indication icon 602 may be static or dynamic.

Alternatively, assuming that the first mid-air gesture is not an enabling gesture, before S301, the method 300 may further include S304.

S304: Obtain an enabling gesture detected by the camera, and obtain, in response to the enabling gesture, the first mid-air gesture that is input by the user and that is detected by the camera.

In step S304, after detecting that the user has input the preset enabling gesture, the processor determines that the user expects to control, by using a mid-air gesture, an application running in the vehicle or a controllable function, and enters the mid-air gesture operation mode. In this case, the processor may continue to collect, by using the camera, each frame of in-vehicle image in real time, and recognize, based on the collected image, a specific mid-air gesture input by the user.

For example, after detecting that the user has input the preset enabling gesture, the processor may use, as a start location A1, a location, of a palm or a finger of the user, that is collected when the enabling gesture ends, and then determine, in real time based on M frames of images that are recently collected, the first mid-air gesture input by the user.

In addition, a difference from a case in which a user uses a mobile phone lies in that the in-vehicle camera can obtain a larger photographing range, and a location of an arm of the user can be considered. For example, a mid-air gesture may be alternatively a mid-air action or making a circle with an arm.

For example, a mid-air gesture is recognized by using a detected key point, to recognize that the user has made a single-finger-up gesture, a two-finger gesture, or the like. Then whether the mid-air gesture is a mid-air gesture related to an application on a current interface is determined by querying a database or the like. If the mid-air gesture is a gesture corresponding to a function of the application on the current interface, the function is used as a target function. If the mid-air gesture is not any function of the application on the current interface, the display does not respond, or prompts the user that the mid-air gesture is incorrect.

With the setting of the enabling gesture, indiscriminate response of the processor caused by an unintentional action of an in-vehicle user can be effectively avoided, thereby ensuring functional stability in the vehicle and driving safety.

The method 300 may further include S305.

S305: In response to the first mid-air gesture, the indication icon displayed on the display moves based on the moving trajectory of the first mid-air gesture.

For example, a space-based adjustment manner is a manner of determining an adjustment amount based on a first distance at which a mid-air gesture moves within a photographing range. In this manner, a continuously adjusted adjustment amount is positively correlated with the first distance at which the mid-air gesture moves within the photographing range. A time-based adjustment manner is a manner of determining an adjustment amount based on holding duration of a mid-air gesture within a photographing range. In this manner, a continuously adjusted adjustment amount is positively correlated with the holding duration of the mid-air gesture within the photographing range. The space-based adjustment manner or the time-based adjustment manner may be set before delivery, or may be open for autonomous setting by the user.

S306: In response to the first mid-air gesture, display, on the display, a second display interface corresponding to the first mid-air gesture.

For example, when the first response operation corresponding to the first mid-air gesture matches the first user who initiates the first mid-air gesture and the first display is not a display in front of the first user, the first display interface is displayed on a second display in the vehicle in response to the first mid-air gesture, and an indication icon on the first display interface is moved based on a moving trajectory of the first mid-air gesture in a preset direction.

Figure 7:
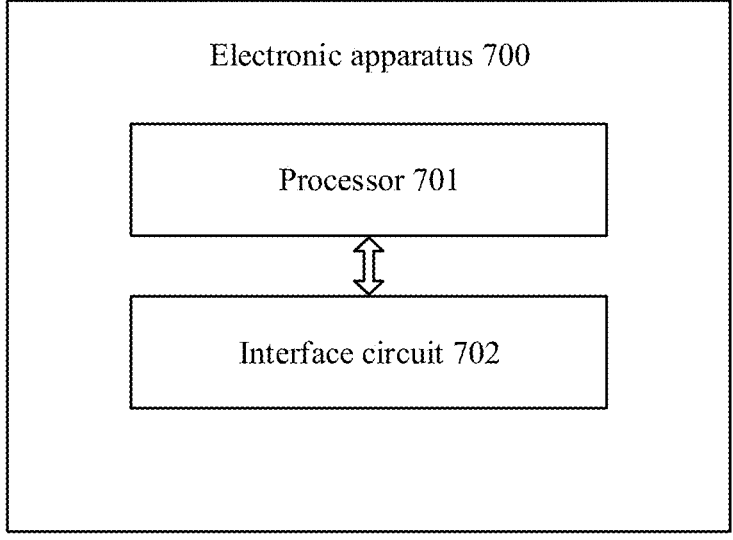
FIG. 7 is a schematic diagram of a structure of an electronic apparatus according to an embodiment of this application.

FIG. 7 is a schematic diagram of a structure of an electronic apparatus according to an embodiment of this application. It should be understood that the electronic apparatus 700 may be a terminal, for example, a vehicle or a vehicle-mounted machine, or may be a built-in chip of a terminal, and may implement the mid-air gesture-based interaction method shown in FIG. 3 and the foregoing optional embodiments. As shown in FIG. 7, the electronic apparatus 700 includes a processor 701 and an interface circuit 702 coupled to the processor. It should be understood that, although only one processor and one interface circuit are shown in FIG. 7, the image processing apparatus 700 may include another quantity of processors and interface circuits.

The interface circuit 702 is connected to another component of the terminal, for example, a memory or another processor. The processor 701 is configured to perform signal interaction with another component by using the interface circuit 702. The interface circuit 702 may be an input/output interface of the processor 701.

The processor 701 may be a processor in a vehicle-mounted device, for example, a vehicle-mounted machine, or may be a processing apparatus sold separately.

For example, the processor 701 reads, by using the interface circuit 702, computer programs or instructions in the memory coupled to the processor 701, and decodes and executes the computer programs or instructions. It should be understood that the computer programs or the instructions may include the foregoing terminal function programs, or may include the foregoing mid-air gesture-based interaction function program used on a terminal. When a corresponding functional program is decoded and executed by the processor 701, the terminal or the electronic apparatus in the terminal can be enabled to implement the solution in the image processing method provided in embodiments of this application.

Optionally, the terminal function programs are stored in an external memory of the electronic apparatus 700. When the terminal function programs are decoded and executed by the processor 701, some or all content of the terminal function programs is temporarily stored in the memory.

Optionally, the terminal function programs are stored in an internal memory of the electronic apparatus 700. When the terminal function programs are stored in the internal memory of the electronic apparatus 700, the electronic apparatus 700 may be disposed in the terminal in this embodiment of the present invention.

Optionally, some content of the terminal function programs is stored in an external memory the electronic apparatus 700, and other content of the terminal function programs is stored in an internal memory of the electronic apparatus 700.

Figure 8:
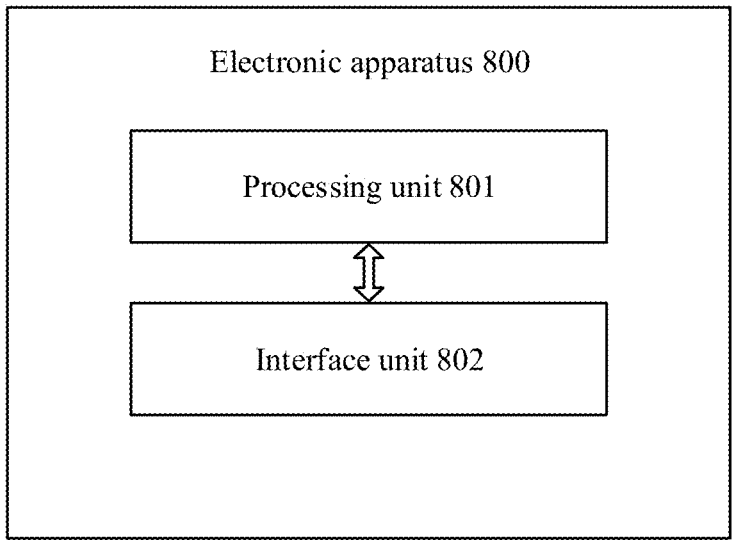
FIG. 8 is a schematic diagram of a structure of another electronic apparatus according to an embodiment of this application.

FIG. 8 is a schematic diagram of a structure of another electronic apparatus according to an embodiment of this application. It should be understood that the electronic apparatus 800 may be a terminal, for example, a vehicle or a vehicle-mounted machine, or may be a built-in chip of a terminal, and may implement the mid-air gesture-based interaction method shown in FIG. 3 and the foregoing optional embodiments. As shown in FIG. 8, the electronic apparatus 800 includes a processing unit 801 and a transceiver unit 802 coupled to the processor. It should be understood that, although only one processing unit and one transceiver unit are shown in FIG. 8, the image processing apparatus 800 may include another quantity of processing units and transceiver units.

The processing unit and the transceiver unit may be implemented by hardware or software. The processing unit 801 may be the processor 701 in FIG. 7, and the transceiver unit 802 may be the interface circuit 702 in FIG. 7.

The electronic apparatus 800 may be configured to perform the method shown in FIG. 3 and the methods in the optional embodiments.

Figure 9:
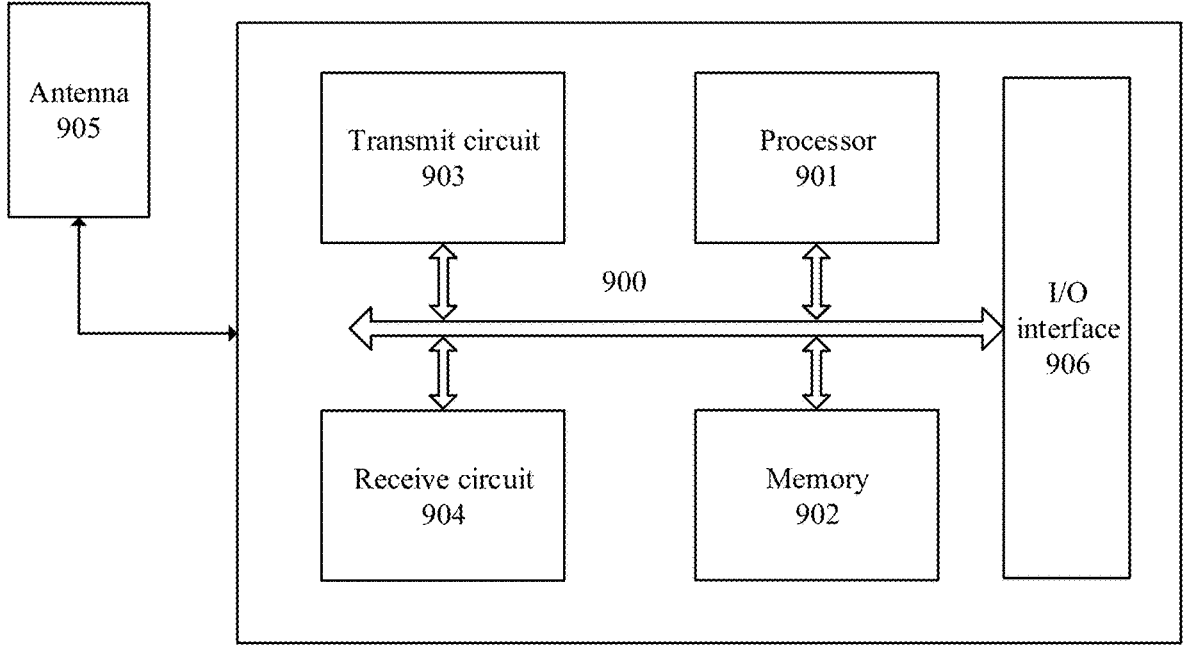
FIG. 9 is a schematic diagram of a structure of another electronic apparatus according to an embodiment of this application.

FIG. 9 is a schematic diagram of a structure of another electronic apparatus according to an embodiment of this application. It should be understood that the electronic apparatus 800 may be a terminal, for example, a vehicle or a vehicle-mounted machine, or may be a built-in chip of a terminal, and may implement the mid-air gesture-based interaction method shown in FIG. 3 and the foregoing optional embodiments. As shown in FIG. 9, the electronic apparatus 900 includes a processor 901 and a memory 902 coupled to the processor 901. It should be understood that, although only one processor and one memory are shown in FIG. 9, the electronic apparatus 901 may include another quantity of processors and memories.

The memory 902 is configured to store computer program or computer instructions. The computer programs or the instructions may be classified into two types based on functions. When a type of computer program or instruction is executed by the processor 901, the electronic apparatus 90 is enabled to implement the steps of the terminal in the wireless communication method in embodiments of the present invention. This type of computer program or instruction may be denoted as a terminal function program. For example, the terminal function program may include program code for implementing the in-vehicle mid-air gesture-based interaction method shown in FIG. 3.

In addition, the electronic apparatus 90 may further include a connection line 900, a transmit circuit 903, a receive circuit 904, an antenna 905, an input/output (I/O) interface 906, and the like. The transmit circuit and the receive circuit may be coupled to the antenna, and are wirelessly connected to another communications device. The transmit circuit and the receive circuit may be alternatively integrated into one transceiver, and the antenna may be a radio frequency antenna supporting a plurality of frequencies. The I/O interface provides a possibility of interacting with another communications device or a user. For example, the I/O interface may be an Ethernet interface or a USB interface. For a terminal, the I/O interface may be a screen, a keyboard, a microphone, a speaker, or a USB interface. The components in the electronic apparatus 90 may be coupled together by using various connection lines (e.g., a bus system). In addition to a data bus, the bus system may further include a power bus, a control bus, a status signal bus, and the like. However, for clear description, various types of buses in this specification are collectively referred to as the bus system.

It can be understood that the processor 901 and the memory 902 may be implemented by using a processing unit and a storage unit instead. The processing unit and the storage unit may be implemented by using code with corresponding functions. The storage unit is configured to store program instructions. The processing unit is configured to execute the program instructions in the storage unit, to implement the method shown in FIG. 3 and the foregoing optional embodiments.

It should be understood that the electronic apparatuses shown in any one of FIG. 1, FIG. 2A, and FIG. 7 to FIG. 9 may be combined with each other. For related design details of the optional embodiments, refer to the optional embodiments, or refer to related design details of the method shown in FIG. 3 and the optional embodiments. Details are not described herein again.

Based on the foregoing descriptions of the implementations, a person skilled in the art may clearly understand that, for the purpose of convenient and brief descriptions, division into the foregoing function modules is merely used as an example for descriptions. During actual application, the foregoing functions may be allocated to different function modules for implementation as required. In other words, an inner structure of an apparatus is divided into different function modules to implement all or some of the functions described above. For a specific working process of the foregoing system, apparatus, and unit, refer to a corresponding process in the foregoing method embodiments. Details are not described herein again.

The terms "first", "second", "third", "fourth", and the like in embodiments and accompanying drawings are used to distinguish between similar objects, but not necessarily used to describe a specific order or sequence. In addition, the terms "comprise", "include", and any variants thereof are intended to indicate a non-exclusive inclusion. For example, a series of steps or units are included. A method, a system, a product, or a device is not necessarily limited to listed steps or units, but may include other steps or units that are not listed and that are inherent to the process, the method, the product, or the device.

It should be understood that, in this application, "at least one" means one or more, and "a plurality of" means two or more. A term "and/or" is used for describing an association relationship between associated objects, and represents that three relationships may exist. For example, "A and/or B" may represent the following three cases: Only A exists, only B exists, and both A and B exist, where A and B may be singular or plural. A character "/" usually indicates an "or" relationship between associated objects. In addition, "at least one of the following items (pieces)" or a similar expression thereof indicates any combination of these items, including a single item (piece) or any combination of a plurality of items (pieces). For example, at least one of a, b, or c may indicate a, b, c, "a and b", "a and c", "b and c", or "a, b, and c", where a, b, and c may be singular or plural.

It should be understood that sequence numbers of the foregoing processes do not mean execution sequences in this application. The execution sequences of the processes should be determined according to functions and internal logic of the processes, and should not be construed as any limitation on implementation processes of embodiments of this application. The term "coupling" mentioned in this application is used to express interworking or interaction between different components, and may include direct connection or indirect connection by using another component.

Function units in embodiments of this application may be integrated into one processing unit, or each of the units may exist alone physically, or two or more units are integrated into one unit. The integrated unit may be implemented in a form of hardware, or may be implemented in a form of a software function unit.

All or some of embodiments of this application may be implemented by using software, hardware, firmware, or any combination thereof. When software is used to implement embodiments, all or some of embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (e.g., a coaxial cable or an optical fiber) or wireless (e.g., infrared, radio, or microwave) manner. The computer-readable storage medium may be any usable medium accessible by the computer, or a data storage device, for example, a server or a data center, integrating one or more usable media. The usable medium may be a magnetic medium, for example, a floppy disk, a hard disk, or a magnetic tape, may be an optical medium, for example, a DVD, or may be a semiconductor medium, for example, a solid-state drive (SSD).

In embodiments of this application, the memory is a device or circuit with a data or information storage capability, and may provide instructions and data for the processor. The memory includes a read-only memory (ROM), a random access memory (RAM), a nonvolatile random access memory (NVRAM), a programmable read-only memory, an electrically erasable programmable memory, a register, or the like.

The foregoing descriptions are merely specific implementations of embodiments of this application, but are not intended to limit the protection scope of embodiments of this application. Any variation or replacement within the technical scope disclosed in embodiments of this application shall fall within the protection scope of embodiments of this application. Therefore, the protection scope of embodiments of this application shall be subject to the protection scope of the claims.

What is claimed is:

1. An in-vehicle mid-air gesture-based interaction method comprising:
   obtaining a first mid-air gesture initiated by a first user that is detected by a camera;
   obtaining a second mid-air gesture initiated by a second user that is detected by the camera; and
   starting a first response operation, corresponding to the first mid-air gesture, in accordance with the first response operation matching the first user,
   wherein the starting is performed after the obtaining the first mid-air gesture and the obtaining the second mid-air gesture, and
   wherein the starting the first response operation in accordance with the first response operation matching the first user includes determining, in accordance with a duration between an initiation time of the second mid-air gesture and an initiation time of the first mid-air gesture being less than a first preset threshold, a user permission of the first user is higher than a user permission of the second user.

2. The method according to claim 1, wherein before the starting, the first response operation, the method further comprises:
   obtaining a response attribute of the first response operation corresponding to the first mid-air gesture;
   obtaining a user attribute of the first user; and
   determining, based on the response attribute of the first response operation and the user attribute of the first user, the first response operation matches the first user,
   wherein the response attribute comprises one or more of the group consisting of:
   a response type,
   a response level,
   a response priority, and
   a response location, and
   wherein the user attribute of the first user comprises one or more of the group consisting of: a user identity, a user location, and a user permission.

3. The method according to claim 2, wherein the obtaining a user attribute of the first user comprises:

determining a user location of the first user based on a picture that corresponds to the first mid-air gesture and that is detected by the camera; and
determining the user identity of the first user based on the user location of the first user.

4. The method according to claim 2, wherein in accordance with the response attribute of the first response operation being a driving operation and the user identity being a driver, the first response operation is determined to be matching the first user.

5. The method according to claim 2, wherein the obtaining a user attribute of the first user comprises:
   determining a user location of the first user based on a picture that corresponds to the first mid-air gesture and that is detected by the camera; and
   wherein the starting the first response operation comprises:
      starting, in accordance with the first response operation corresponding to the first mid-air gesture matching the first user, the first response operation based on the user location of the first user in response to the first mid-air gesture.

6. The method according to claim 5, wherein the starting the first response operation based on the user location of the first user in response to the first mid-air gesture comprises:
   starting, in accordance with the first response operation corresponding to the first mid-air gesture matching the first user who initiates the first mid-air gesture, the first response operation in a region corresponding to the user location of the first user in response to the first mid-air gesture.

7. The method according to claim 5, wherein before the starting the first response operation in response to the first mid-air gesture, the method further comprises:
   displaying a first display interface on a first display in a vehicle; and
   wherein the starting the first response operation based on the user location of the first user in response to the first mid-air gesture specifically comprises:
      displaying, in accordance with the first response operation corresponding to the first mid-air gesture matching the first user and the first display not being a display in front of the first user, a first display interface on a second display in the vehicle in response to the first mid-air gesture, and
      moving an indication icon on the first display interface based on a moving trajectory of the first mid-air gesture in a preset direction.

8. The method according to claim 1, wherein the starting the first response operation in response to the first mid-air gesture comprises:
   starting, in accordance with a user permission threshold required for the first response operation corresponding to the first mid-air gesture being less than or equal to the user permission of the first user, the first response operation in response to the first mid-air gesture.

9. The method according to claim 8, wherein a control permission of the driver is higher than a control permission of another passenger.

10. The method according to claim 1, wherein before the starting the first response operation in response to the first mid-air gesture, the method further comprises:
   displaying, in accordance with a distance between a location of the first mid-air gesture and the camera-is being greater than a second preset threshold, a prompt message on a display in the vehicle, wherein the prompt message is used to prompt the first user to initiate a mid-air gesture to another camera.

11. The method according to claim 1, wherein before the starting the first response operation in response to the first mid-air gesture, the method further comprises:

displaying, in accordance with a projection ratio of the first mid-air gesture relative to a reference plane of a first camera is less than a third preset threshold, a prompt message on a display in the vehicle, wherein the prompt message is used to prompt the first user to initiate a mid-air gesture to another camera.

12. An electronic apparatus, comprising:

an interface circuit; and a processor, wherein the interface circuit is configured to carry out:

obtaining a first mid-air gesture initiated by a first user that is detected by a camera; and obtaining a second mid-air gesture initiated by a second user that is detected by the camera; and wherein the processor is configured to carry out:

starting a first response operation, corresponding to the first mid-air gesture, in accordance with the first response operation matching the first user, wherein the starting is performed after the obtaining the first mid-air gesture and the obtaining the second mid-air gesture, and wherein the starting the first response operation in accordance with the first response operation matching the first user includes determining, in accordance with a duration between an initiation time of the second mid-air gesture and an initiation time of the first mid-air gesture being less than a first preset threshold, a user permission of the first user is higher than a user permission of the second user.

13. The electronic apparatus according to claim 12, wherein before the starting the first response operation, the interface circuit is further configured to carry out:

obtaining a response attribute of the first response operation corresponding to the first mid-air gesture;

obtaining a user attribute of the first user; and wherein the processor is further configured to carry out:

determining, based on the response attribute of the first response operation and the user attribute of the first user, the first response operation matches the first user, wherein the response attribute comprises one or more of the group consisting of:

a response type, a response level, a response priority, and a response location; and wherein the user attribute of the first user comprises one or more of the group consisting of:

a user identity, a user location, and a user permission.

14. The electronic apparatus according to claim 13, wherein the obtaining a user attribute of the first user comprises:

determining a user location of the first user based on a picture that corresponds to the first mid-air gesture and that is detected by the camera; and determining the user identity of the first user based on the user location of the first user.

15. The electronic apparatus according to claim 13, wherein in accordance with the response attribute of the first response operation is being a driving operation and the user identity being a driver, the first response operation is determined to be matching the first user.

16. The electronic apparatus according to claim 13, wherein the obtaining a user attribute of the first user comprises:

determining a user location of the first user based on a picture that corresponds to the first mid-air gesture and that is detected by the camera; and wherein the starting the first response operation comprises:

starting, in accordance with the first response operation corresponding to the first mid-air gesture matching the first user, the first response operation based on the user location of the first user in response to the first mid-air gesture.

17. The electronic apparatus according to claim 16, wherein the starting the first response operation based on the user location of the first user in response to the first mid-air gesture comprises:

starting, in accordance with the first response operation corresponding to the first mid-air gesture matching the first user who initiates the first mid-air gesture, the first response operation in a region corresponding to the user location of the first user in response to the first mid-air gesture.

18. The electronic apparatus according to claim 16, wherein the starting processor is further configured to carry out:

displaying a first display interface on a first display in a vehicle; and wherein the starting the first response operation based on the user location of the first user in response to the first mid-air gesture comprises:

displaying, in accordance with the first response operation corresponding to the first mid-air gesture matching the first user and the first display not being a display in front of the first user, a first display interface on a second display in the vehicle in response to the first mid-air gesture, and moving an indication icon on the first display interface based on a moving trajectory of the first mid-air gesture in a preset direction.

* * * * *